United States Patent
Kwon

(10) Patent No.: US 8,997,794 B2
(45) Date of Patent: Apr. 7, 2015

(54) VIBRATION ABSORBING PIPE FOR REFRIGERATION COMPRESSOR

(71) Applicant: Hyun-Joong Kwon, Incheon (KR)

(72) Inventor: Hyun-Joong Kwon, Incheon (KR)

(73) Assignee: Sung-Kyu Chang, Incheon (KR)

( * ) Notice: Subject to any disclaimer, the term of this patent is extended or adjusted under 35 U.S.C. 154(b) by 100 days.

(21) Appl. No.: 13/865,438

(22) Filed: Apr. 18, 2013

(65) Prior Publication Data

US 2014/0311610 A1    Oct. 23, 2014

(51) Int. Cl.
*F16L 9/00* (2006.01)
*F16L 11/15* (2006.01)
*F16L 55/033* (2006.01)

(52) U.S. Cl.
CPC ............. *F16L 11/15* (2013.01); *F16L 55/0333* (2013.01); *Y10S 285/903* (2013.01)

(58) Field of Classification Search
USPC .......... 138/121, 122, 109, 127; 285/242, 245, 285/256, 903
See application file for complete search history.

(56) References Cited

U.S. PATENT DOCUMENTS

| 3,605,232 | A | * | 9/1971 | Hines ...................... 29/890.144 |
|---|---|---|---|---|
| 4,089,351 | A | * | 5/1978 | Ward et al. ................... 138/109 |
| 5,803,128 | A | * | 9/1998 | Reed ............................ 138/123 |
| 5,813,438 | A | * | 9/1998 | Reed ............................ 138/121 |
| 7,021,673 | B2 | * | 4/2006 | Furuta et al. ................. 285/242 |
| 7,104,285 | B2 | * | 9/2006 | Furuta .......................... 138/121 |
| 7,556,065 | B2 | * | 7/2009 | Koizumi ....................... 138/121 |
| 2004/0020545 | A1 | * | 2/2004 | Takagi et al. ................ 138/109 |
| 2004/0118470 | A1 | * | 6/2004 | Furuta .......................... 138/139 |
| 2005/0099005 | A1 | * | 5/2005 | Fullbeck et al. ............. 285/256 |
| 2006/0192380 | A1 | * | 8/2006 | Fullbeck et al. ............. 285/256 |
| 2008/0191472 | A1 | * | 8/2008 | Vieregge ...................... 285/256 |

\* cited by examiner

*Primary Examiner* — Patrick F Brinson
(74) *Attorney, Agent, or Firm* — John K. Park; Park Law Firm

(57) ABSTRACT

The invention relates to a vibration absorbing pipe for a refrigeration compressor including: a corrugated pipe; a first connection pipe having concavo and convex portions; a wire braided net adapted to be fitted to the outer peripheral surfaces of the corrugated pipe and the first connection pipe; and a first compression ring having concavo and convex portions formed on the inner peripheral surface thereof in such a manner as to be compressed against the front end periphery of the wire braided net located just on the top of the first connection pipe, wherein the first connection pipe has an adjusting groove formed on one side outer peripheral surface thereof, so that through the width adjustment of the adjusting groove, a thickness of one side bonding portion of the first connection pipe is the same as a thickness of one side bonding portion of the corrugated pipe.

3 Claims, 8 Drawing Sheets

VIBRATION ABSORBING PIPE FOR REFRIGERATION COMPRESSOR

BACKGROUND OF THE INVENTION

1. Field of the Invention

The present invention relates to a vibration absorbing pipe, and more particularly, to a vibration absorbing pipe for a refrigeration compressor that is capable of more rigidly fixing a braided net to the outer peripheral surface of a corrugated pipe and preventing the generation of fine cracks on both ends of the corrugated pipe, thereby stably absorbing strong vibrations generated during the supply of refrigerant gas discharged to a high pressure from the refrigeration compressor.

2. Background of the Related Art

A compressor is necessarily provided to compress air, refrigerant, special gas or the like in the field of refrigerating and air-conditioning industry. The compressor, which is widely used over the whole industrial fields, receives power from an electric motor or turbine and applies compression to the air, refrigerant, or other special gas, thereby compressing the operating gas and increasing the pressure of the compressed gas.

A conventional vibration absorbing pipe for a refrigeration compressor will be explained with reference to FIGS. 1 and 2. FIGS. 1 and 2 are sectional views showing a conventional vibration absorbing pipe for a refrigeration compressor. Typically, strong vibrations are generated when refrigerant gas is compressed to a high pressure and supplied from the refrigeration compressor, and so as to absorb the strong vibrations, thus, a corrugated pipe 40 is provided, as shown in FIG. 1. The corrugated pipe 40 serves to absorb the pressure of the refrigerant gas discharged to the high pressure in an extended and contracted manner, thereby reducing the noise and vibrations generated during the supply of the refrigerant gas from the refrigeration compressor. As shown in the circle enlarged in FIG. 1, a wire braided net 41, which is made of a thin metal wire, is fitted to the outer peripheral surface of the corrugated pipe 40.

The wire braided net 41 is expanded along the axial direction of the corrugated pipe 40 when the pressure of the refrigerant gas supplied to the high pressure is absorbed to the corrugated pipe 40, thereby arbitrarily setting the expansion limit range of the corrugated pipe 40 being expanded in the axial direction thereof. Accordingly, the formation of the wire braided net 41 previously prevents the corrugated pipe 40 from being locally broken or cracked by the excessive pressure of the refrigerant gas.

So as to effectively set the expansion limit range of the corrugated pipe 40, it is important to rigidly fit the wire braided net 41 to the outer peripheral surface of the corrugated pipe 40. Accordingly, as shown in the circle enlarged in FIG. 1, a fixing ring 50 is fitted to the outer peripheral surface of the wire braided net 41 and rigidly bonded to an inlet and outlet pipe 51 fitted to the front end of the corrugated pipe 40 by means of brazing bonding.

The bonding state through the brazing bonding is shown in the circle enlarged in FIG. 2, wherein a filler metal is melted to surround the inlet and outlet pipe 51, the fixing ring 50, the corrugated pipe 40 and the wire braided net 41 and thus to form a bead 42. However, high heat is generated during the brazing bonding to cause the front end periphery of the wire braided net 41 braided by means of the thin metal wire to be locally burnt or oxidized, and as shown in the circle enlarged in FIG. 2, an oxidation point "a" is generated to make the fixing force of the wire braided net 41 reduced.

While the refrigerant gas is being transmitted through the vibration absorbing pipe for the refrigeration compressor, water drops occur on the outer peripheral surface of the vibration absorbing pipe by means of dew condensation and enter the oxidation point "a", so that the wire braided net 41 on which the oxidation point "a" is located may rust, and as time is passed, the rust on the front end periphery of the wire braided net 41 is increasingly generated to gradually decrease the fixing force of the wire braided net 41.

On the other hand, as shown in the circle enlarged in FIG. 2, a fine cracking point "b" is generated on the front end periphery of the corrugated pipe 40 during the brazing bonding process. That is, the corrugated pipe 40 is made of a thin metal capable of absorb the vibration of the high pressure refrigerant gas and optimize the flexibility thereof in an extended and contracted manner. In the brazing bonding process, accordingly, high temperature flames are applied to cause the front end periphery of the corrugated pipe 40 having the thin thickness to be finely cracked, and as shown in the circle enlarged in FIG. 2, the refrigerant gas is passed through the cracking point "b" and leaks to the outside via the bead 42. The leakage of the refrigerant gas undesirably gives serious damages to the workers operating in small space.

SUMMARY OF THE INVENTION

Accordingly, the present invention has been made in view of the above-mentioned problems occurring in the prior art, and it is an object of the present invention to provide a vibration absorbing pipe for a refrigeration compressor that is capable of allowing a wire braided net fitted to the outer peripheral surface of a corrugated pipe to be fixedly compressed against the corrugated pipe by means of a connection pipe having concave and convex portions formed on the outer peripheral surface thereof and a compression ring having concavo and convex portions formed on the inner peripheral surface thereof, so that the fixation of the wire braided net to the corrugated pipe can be performed not by means of brazing bonding, but by means of assembling.

To accomplish the above object, according to a first aspect of the present invention, there is provided a vibration absorbing pipe for a refrigeration compressor including: a corrugated pipe; a first connection pipe having concavo and convex portions formed on the outer peripheral surface thereof in such a manner as to be bonded to one side of the corrugated pipe; a wire braided net adapted to be fitted to the outer peripheral surfaces of the corrugated pipe and the first connection pipe; and a first compression ring having concavo and convex portions formed on the inner peripheral surface thereof in such a manner as to be fixedly compressed against the front end periphery of the wire braided net located just on the top of the first connection pipe.

To accomplish the above object, according to a second aspect of the present invention, there is provided a vibration absorbing pipe for a refrigeration compressor including: a corrugated pipe; a second connection pipe having an inclined groove having an inclined portion formed on the outer peripheral surface thereof in such a manner as to be bonded to one side of the corrugated pipe; a wire braided net adapted to be fitted to the outer peripheral surfaces of the corrugated pipe and the second connection pip; and a second compression ring having an inclined protruding portion formed on the inner peripheral surface thereof in such a manner as to be fixedly compressed against the front end periphery of the wire braided net located just on the top of the second connection pipe.

To accomplish the above object, according to a third aspect of the present invention, there is provided a vibration absorbing pipe for a refrigeration compressor including: a corrugated pipe; a third connection pipe adapted to be bonded to one side of the corrugated pipe and having an inclined groove having an inclined portion formed on one side outer peripheral surface thereof and concavo and convex portions formed on the rear side of the inclined groove; a wire braided net adapted to be fitted to the outer peripheral surfaces of the corrugated pipe and the third connection pipe; and a third compression ring having an inclined protruding portion formed on one side inner peripheral surface thereof in such a manner as to be fixedly compressed against the front end periphery of the wire braided net located just on the top of the third connection pipe.

According to the present invention, preferably, each of the first to third connection pipes has an adjusting groove formed on one side outer peripheral surface thereof, so that through the width adjustment of the adjusting groove, a thickness of one side bonding portion of each connection pipe is the same as a thickness of one side bonding portion of the corrugated pipe.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on a vibration absorbing pipe for a refrigeration compressor according to the preferred embodiments of the present invention will be in detail given with reference to the attached drawing.

Figure 1:
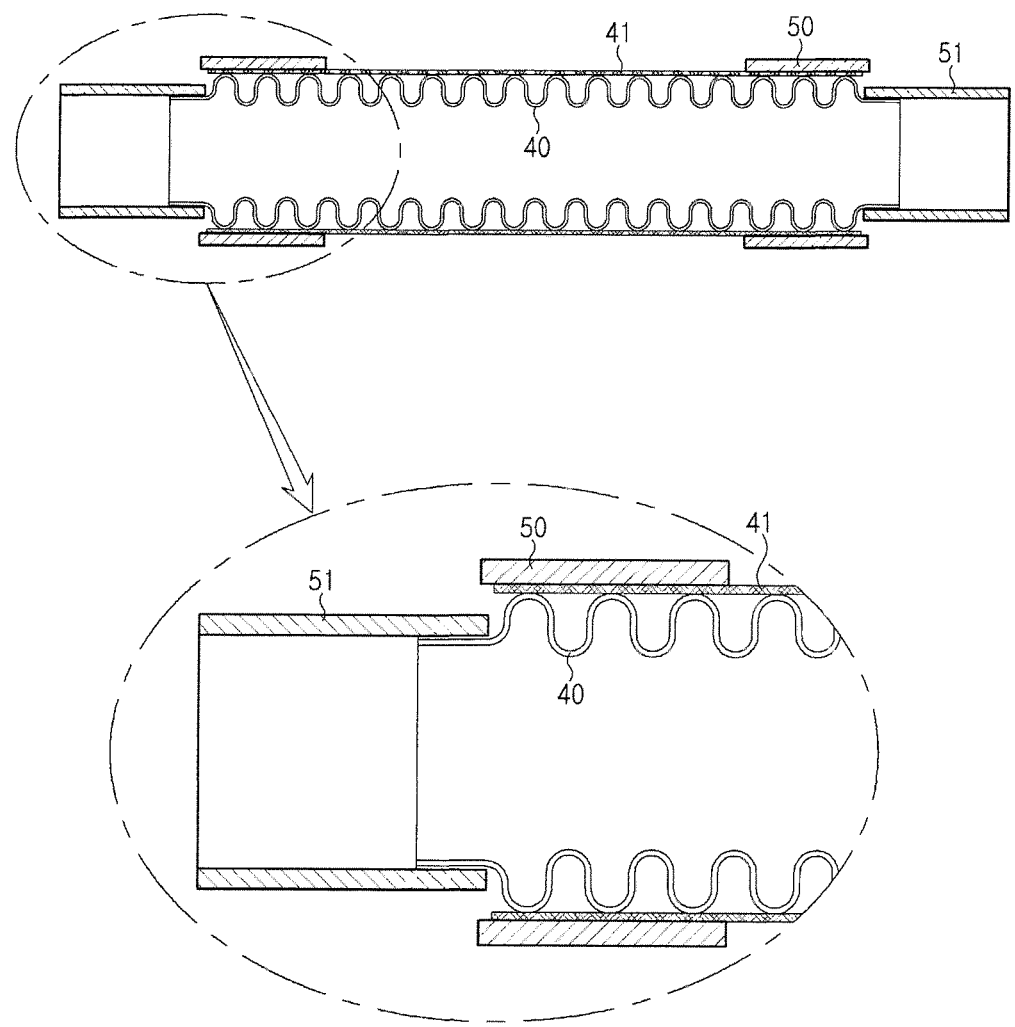
FIGS. 1 and 2 are sectional views showing a conventional vibration absorbing pipe for a refrigeration compressor.
Figure 2:
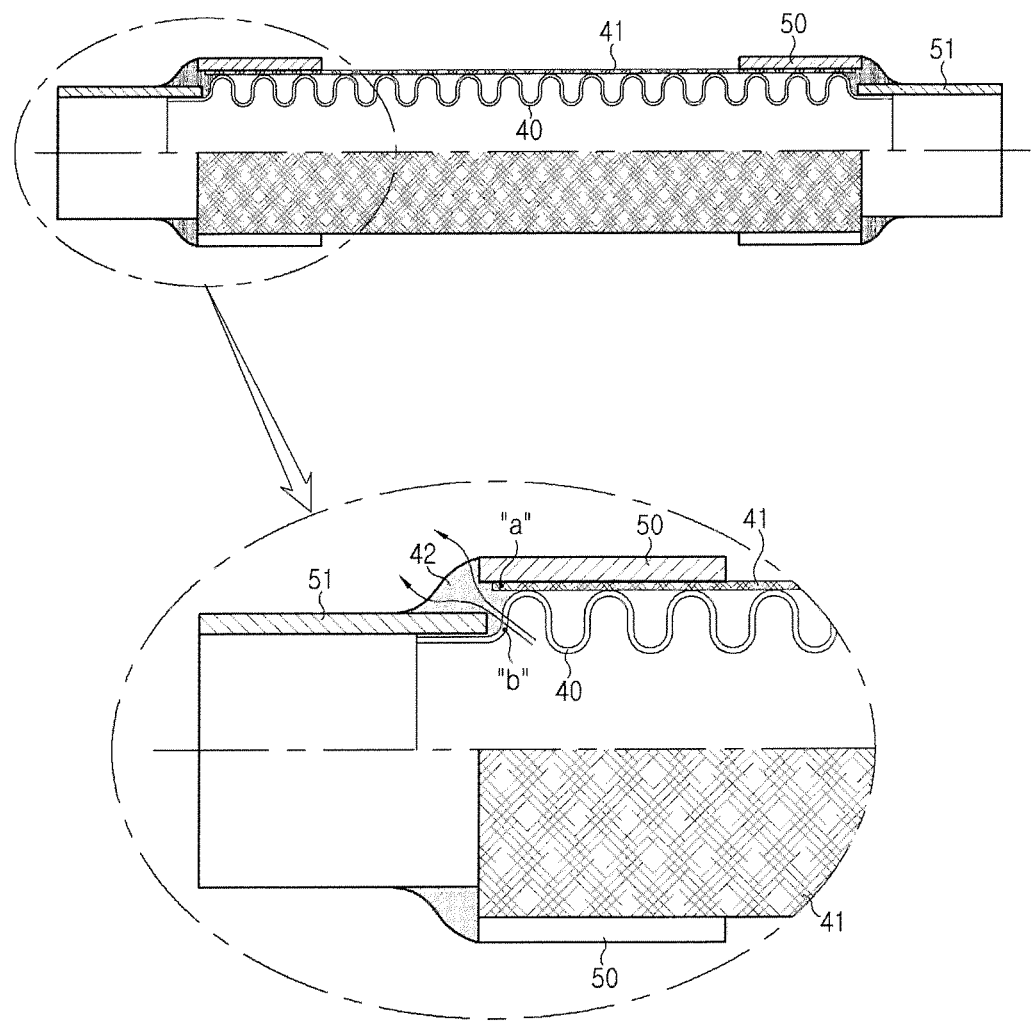
Figure 3:
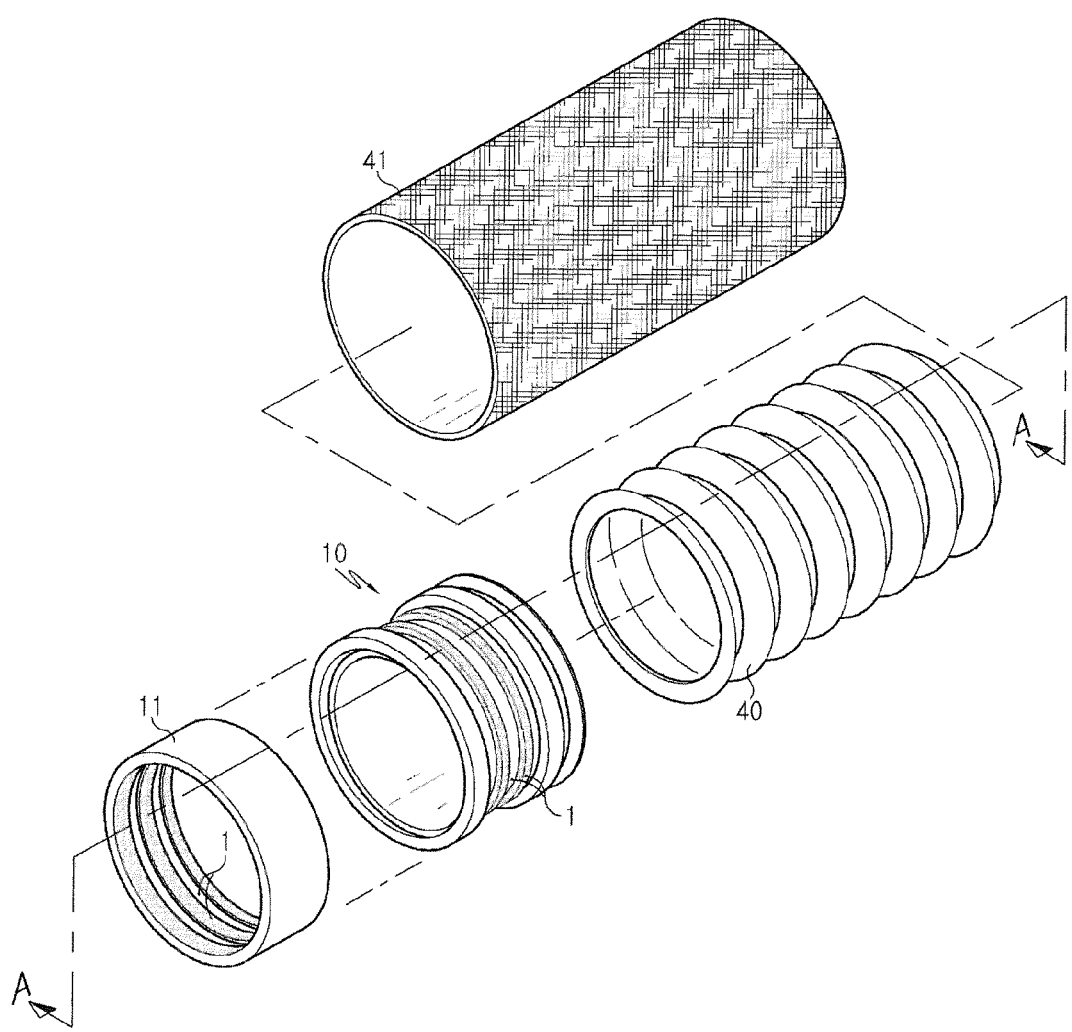
FIG. 3 is a perspective view showing a vibration absorbing pipe for a refrigeration compressor according to the present invention.

FIG. 3 is a perspective view showing a vibration absorbing pipe for a refrigeration compressor according to the present invention. So as to in an extended and contracted manner absorb the strong vibrations generated when the refrigerant gas is compressed to a high pressure and supplied from a refrigeration compressor, as shown in FIG. 3, the vibration absorbing pipe according to the present invention includes a corrugated pipe 40 and a first connection pipe 10 fixed to one side of the corrugated pipe 40, around which concavo and convex portions 1 are formed.

Further, a wire braided net 41 made of a thin metal yarn is fitted to the outer peripheral surface of the corrugated pipe 40 and serves to arbitrarily set the expansion limit range of the corrugated pipe 40 in the process where the corrugated pipe 40 is expanded along the axial direction thereof by means of the excessive pressure of the refrigerant gas discharged to a high pressure. If the wire braided net 41 does not exist, the corrugated pipe 40 may be broken due to the refrigerant gas supplied to a high pressure.

On the other hand, the front end periphery of the wire braided net 41 fitted to the outer peripheral surface of the corrugated pipe 40 is located around the outer peripheral surface of the first connection pipe 10, and thus, as shown in FIG. 3, the front end periphery of the wire braided net 41 located on the outer peripheral surface of the first connection pipe 10 is rigidly compressed thereto through a first compression ring 11 having concave and convex portions 1 formed on the inner peripheral surface thereof. At this time, the first compression ring 11 is rigidly mounted by means of a separate compressing machine.

Figure 4:
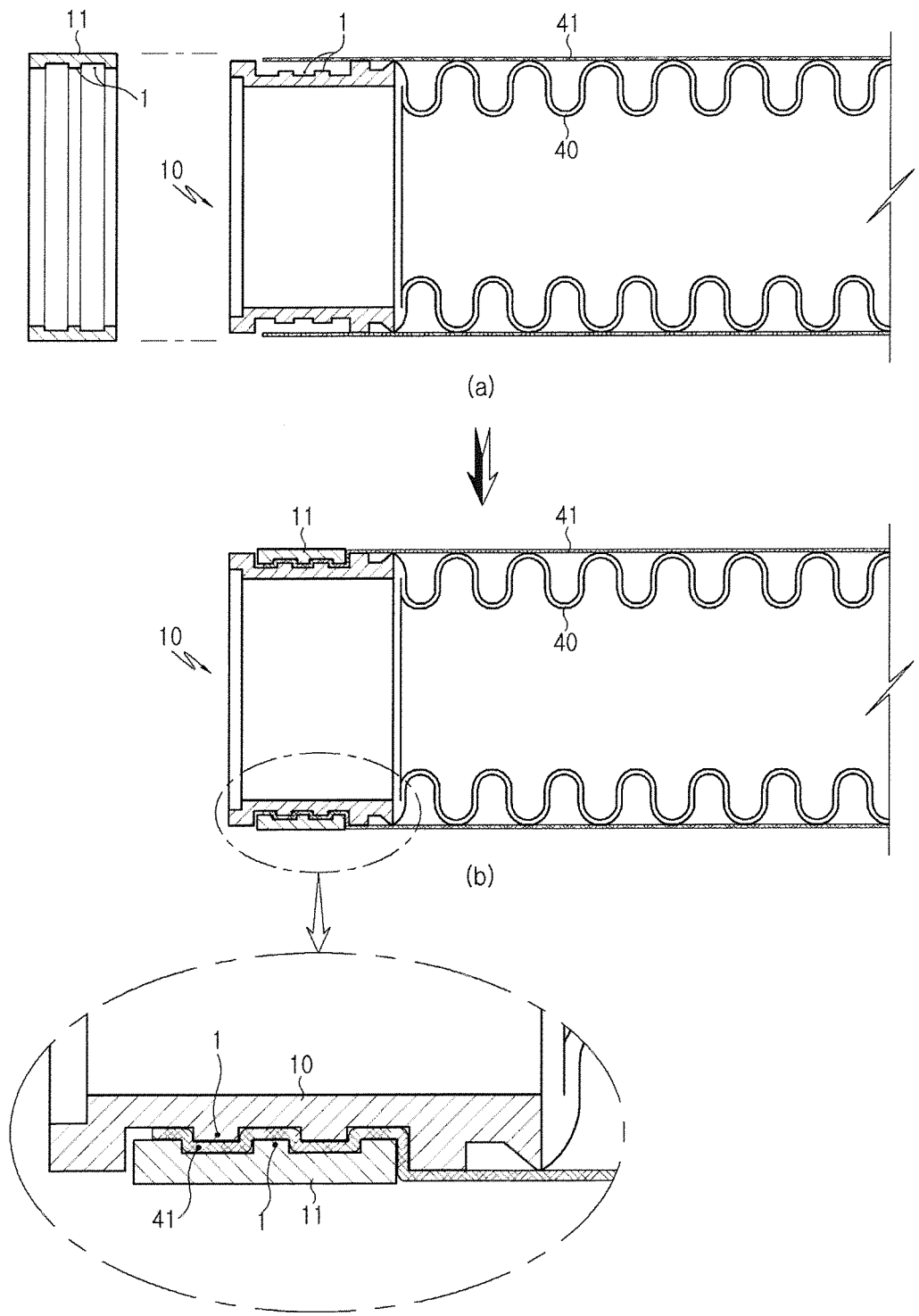
FIGS. 4a and 4b are sectional views showing an example of a first connection pipe in the vibration absorbing pipe for a refrigeration compressor according to the present invention.

FIGS. 4a and 4b are sectional views taken along the line A-A of FIG. 3, showing one example of the concave and convex portions 1 of the first connection pipe 10 and the first compression ring 11. As shown in FIG. 4a, the concave and convex portions 1 formed on the outer peripheral surface of the first connection pipe 10 and the concave and convex portions 1 formed on the inner peripheral surface of the first compression ring 11 have angled sectional shapes. Accordingly, as shown in the circle enlarged of FIG. 4b, the front end periphery of the wire braided net 41 is interposed in the angled form between the concave and convex portions 1 of the first connection pipe 10 and the concave and convex portions 1 of the first compression ring 11 and rigidly located fixedly therebetween.

Figure 5:
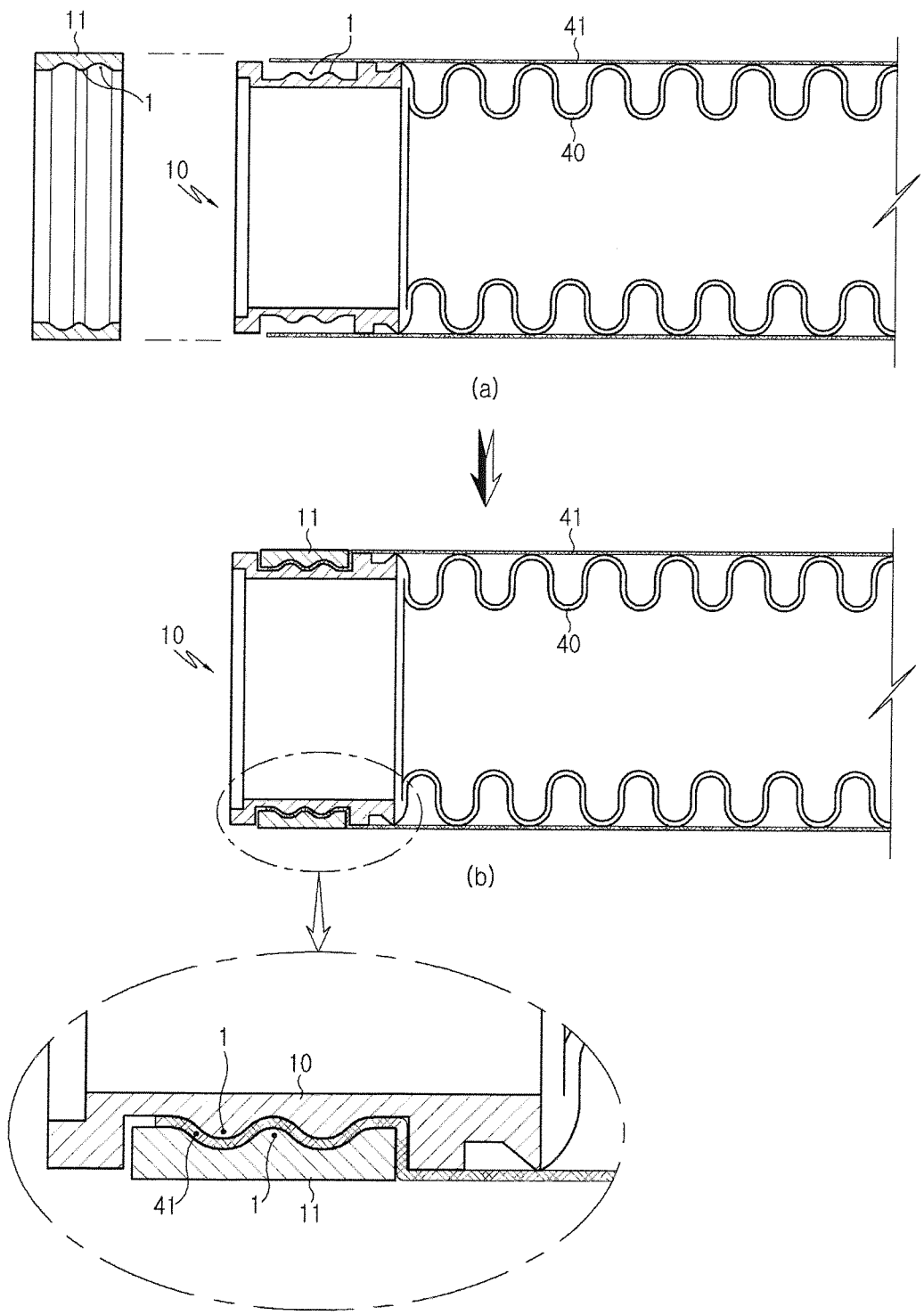
FIGS. 5a and 5b are sectional views showing another example of the first connection pipe in the vibration absorbing pipe for a refrigeration compressor according to the present invention.

FIGS. 5a and 5b are sectional views taken along the line A-A of FIG. 3, showing another example of the concave and convex portions 1 of the first connection pipe 10 and the first compression ring 11. As shown in FIG. 5a, the concave and convex portions 1 formed on the outer peripheral surface of the first connection pipe 10 and the concave and convex portions 1 formed on the inner peripheral surface of the first compression ring 11 have curved waveform sectional shapes. Accordingly, as shown in the circle enlarged of FIG. 5b, the front end periphery of the wire braided net 41 is interposed in the form of the curved waveforms between the concave and convex portions 1 of the first connection pipe 10 and the concave and convex portions of the first compression ring 11 and rigidly located fixedly therebetween.

Figure 6:
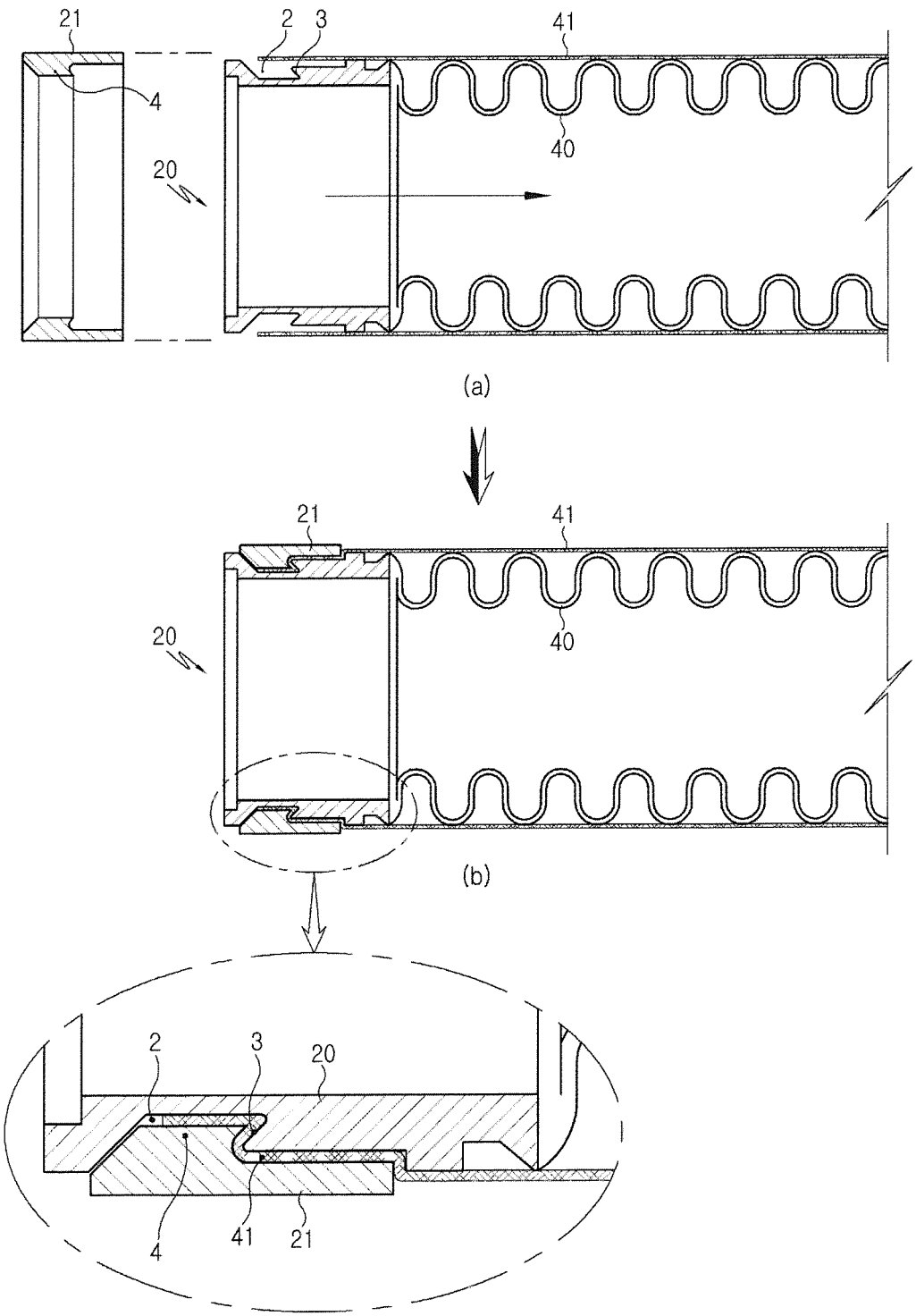
FIGS. 6a and 6b are sectional views showing a second connection pipe in the vibration absorbing pipe for a refrigeration compressor according to the present invention.

FIGS. 6a and 6b are sectional views taken along the line A-A of FIG. 3, showing one example of an inclined groove 2 having an inclined portion 3 formed on a second connection pipe 20 and an inclined protruding portion 4 of a second compression ring 21. As shown in FIG. 6a, the inclined groove 2 having the inclined portion 3 is formed on one side of the outer peripheral surface of the second connection pipe 20, and the inclined protruding portion 4 corresponding to the inclined groove 2 of the second connection pipe 20 is formed on the inner peripheral surface of the second compression ring 21. Accordingly, as shown in the circle enlarged of FIG. 6b, the front end periphery of the wire braided net 41 is interposed in the form bent along the inclined portion 3 between the inclined groove 2 of the second connection pipe 20 and the inclined protruding portion 4 of the second compression ring 21 and rigidly located fixedly therebetween.

Figure 7:
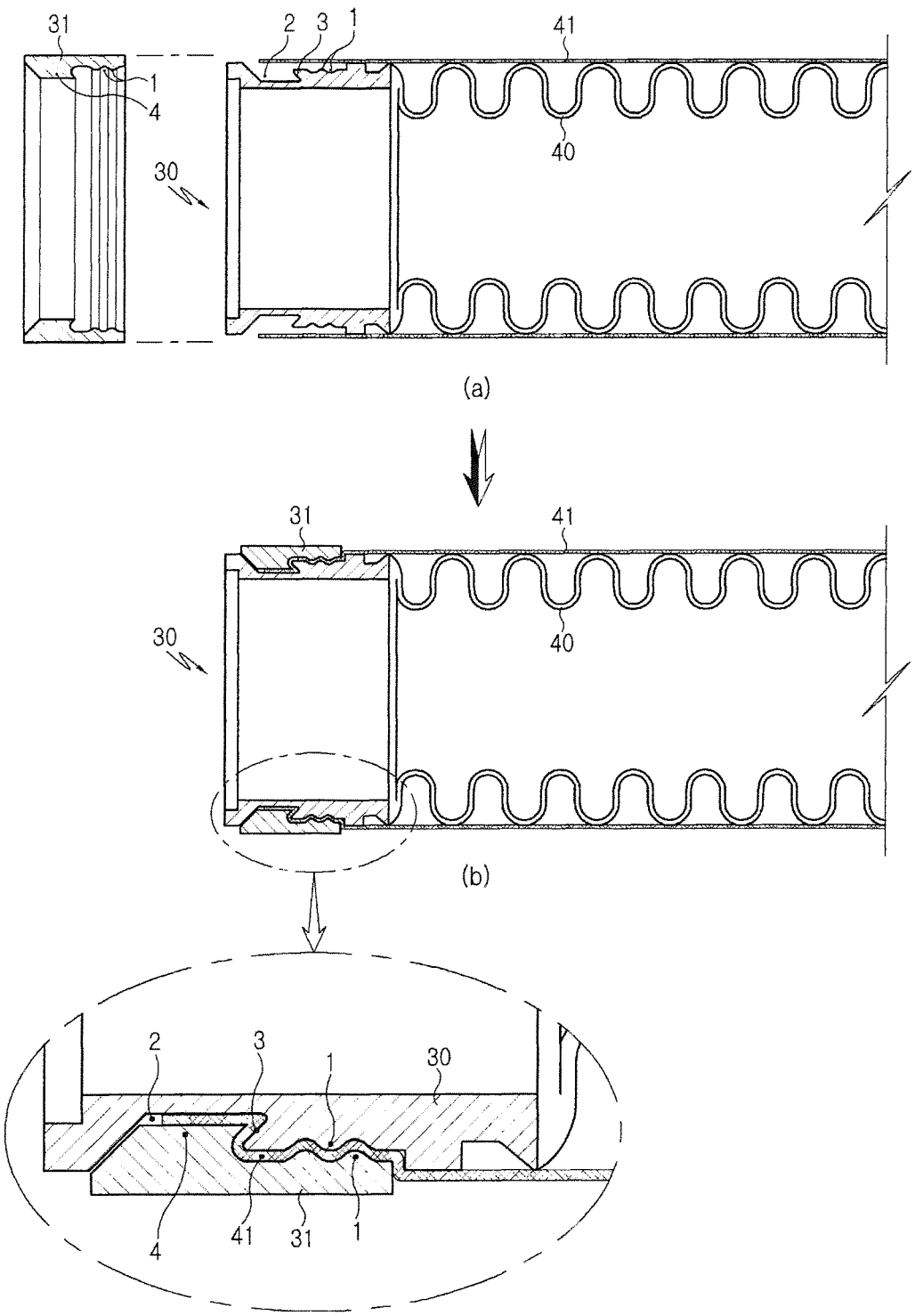
FIGS. 7a and 7b are sectional views showing a third connection pipe in the vibration absorbing pipe for a refrigeration compressor according to the present invention.

FIGS. 7a and 7b are sectional views taken along the line A-A of FIG. 3, showing one example of an inclined groove 2 having an inclined portion 3 and concave and convex portions 1 formed on a third connection pipe 30 and an inclined protruding portion 4 and concave and convex portions 1 of a third compression ring 31. As shown in FIG. 7a, the inclined groove 2 having the inclined portion 3 is formed on one side of the outer peripheral surface of the third connection pipe 30 and the concave and convex portions 1 are formed at the rear side of the inclined groove 2, while the inclined protruding portion 4 corresponding to the inclined groove 2 of the second connection pipe 20 is being formed on the inner peripheral surface of the third compression ring 31 and the concave and convex portions 1 are being formed at the rear side of the inclined protruding portion 4.

Accordingly, as shown in the circle enlarged of FIG. 7b, the front end periphery of the wire braided net 41 is interposed in the form bent along the inclined portion 3 and in the form curved along the concave and convex portions 1 between the inclined groove 2 and the concave and convex portions 1 of the third connection pipe 30 and the inclined protruding portion 4 and the concave and convex portions 1 of the third compression ring 31 and rigidly located fixedly therebetween.

The concave and convex portions 1, the inclined groove 2, and the inclined protruding portion 4 as shown in FIGS. 4a to 7b are configured to allow the front end periphery of the wire braided net 41 to be rigidly fixed between the first, second or third connection pipe 10, 20 or 30 and the first, second or third compressing ring 11, 21 or 31, and accordingly, the first, second or third compressing ring 11, 21 or 31 is fastened through the separate compression machine, thereby applying a strong fixing force to the front end periphery of the wire braided net 41.

Figure 8:
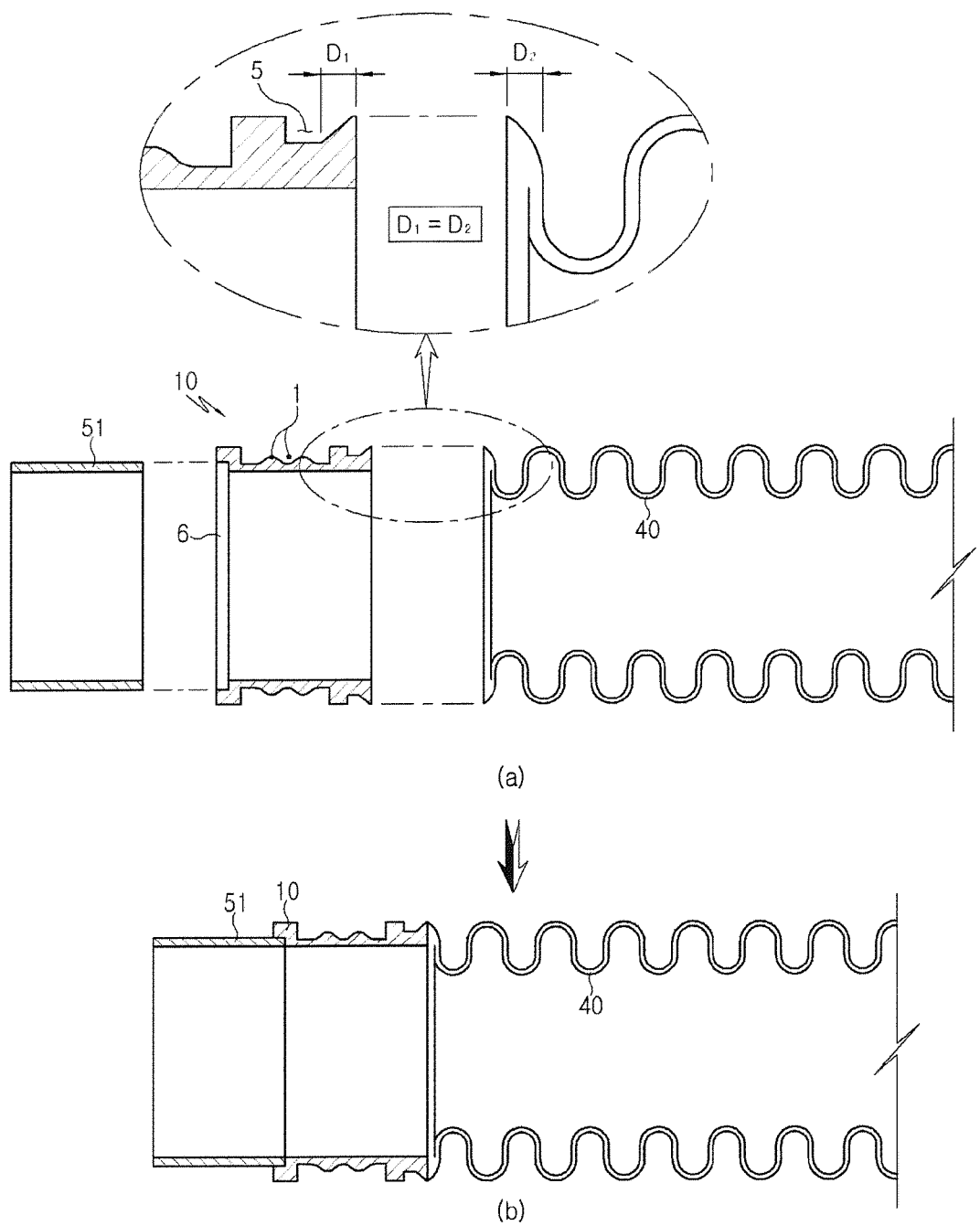
FIGS. 8a and 8b are sectional views showing an adjusting groove of the first to third connection pipes in the vibration absorbing pipe for a refrigeration compressor according to the present invention.

FIGS. 8a and 8b are sectional views showing an adjusting groove 5 of each of the first, second and third connection pipes 10, 20 and 30, wherein the adjusting groove 5 is formed on only the first connection pipe 10, but it can be formed on one sides of all of the first to third connection pipes 10, 20 and 30.

Accordingly, as shown in the circle enlarged of FIG. 8a, in the process where one side periphery of the corrugated pipe 40 and one side periphery of the first connection pipe 10 are bonded autogenously to each other by means of TIG welding, without any separate filler metal, the adjusting groove 5 is adjusted in width in the process of the machining to allow a thickness $D_1$ of one side bonding portion of the first connection pipe 10 to be same as a thickness $D_2$ of one side bonding portion of the corrugated pipe 40.

After that, in the state where the thickness $D_1$ of one side bonding portion of the first connection pipe 10 and the thickness $D_2$ of one side bonding portion of the corrugated pipe 40 are the same as each other, they are brought into contact with each other to the same thickness and have autogenous welding through the TIG welding, thereby improving the strength of the bonded portion.

On the other hand, as shown in FIG. 8a, the first connection pipe 10 has an intake groove 6 formed on the inner peripheral surface of the other side thereof in such a manner as to allow an inlet and outlet pipe 51 to be easily bonded thereto. After the front end periphery of the inlet and outlet pipe 51 is insertedly fitted to the intake groove 6, the first connection pipe 10 and the inlet and outlet pipe 51 are bonded to each other by means of brazing bonding.

As described above, the vibration absorbing pipe for the refrigeration compressor according to the present invention allows the front end periphery of the wire braided net 41 fitted to the outer peripheral surface of the corrugated pipe 40 to be fixed to the corrugated pipe 40 by means of the first, second or third connection pipe 10, 20 or 30 having the concave and convex portions 1 and the inclined groove 2 formed on the outer peripheral surface thereof and the first, second or third compression ring 11, 21 or 31 having the concave and convex portions 1 and the inclined protruding portion 4 formed on the inner peripheral surface thereof, so that conventional brazing bonding using flames is basically not needed, thereby avoiding the oxidation of the front end periphery of the wire braided net 41 due to the flames and further allowing the wire braided net 41 to be rigidly fixed to the outer peripheral surface of the corrugated pipe 40.

So as to enhance the bonding strength in the autogenous welding process through the TIG welding upon the bonding between the each connection pipe and the corrugated pipe, additionally, the vibration absorbing pipe for the refrigeration compressor according to the present invention is provided with the adjusting groove 5 formed on one sides of the first to third connection pipes 10, 20 and 30, so that through the width adjustment of the adjusting groove 5, the thickness $D_1$ of one side bonding portion of each of the first to third connection pipes 10, 20 is the same as the thickness $D_2$ of one side bonding portion of the corrugated pipe 40.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A vibration absorbing pipe for a refrigeration compressor, comprising:
    a corrugated pipe 40;
    a first connection pipe 10 adapted to be bonded to one side of the corrugated pipe 40 and having concavo and convex portions 1 formed on the outer peripheral surface thereof;
    a wire braided net 41 adapted to be fitted to the outer peripheral surfaces of the corrugated pipe 40 and the first connection pipe 10; and
    a first compression ring 11 having concavo and convex portions 1 formed on the inner peripheral surface thereof in such a manner as to be compressed against the front end periphery of the wire braided net 41 located just on the top of the first connection pipe 10,
    wherein the first connection pipe 10 has an adjusting groove 5 formed on one side outer peripheral surface thereof, so that through the width adjustment of the adjusting groove 5, a thickness $D_1$ of one side bonding portion of the first connection pipe 10 is the same as a thickness $D_2$ of one side bonding portion of the corrugated pipe 40.

2. A vibration absorbing pipe for a refrigeration compressor, comprising:
    a corrugated pipe 40;
    a connection pipe 20 having an inclined groove 2 having an inclined portion 3 adapted to be bonded to one side of the corrugated pipe 40 and formed on the outer peripheral surface thereof;
    a wire braided net 41 adapted to be fitted to the outer peripheral surfaces of the corrugated pipe 40 and the connection pipe 20; and
    a compression ring 21 having an inclined protruding portion 4 formed on the inner peripheral surface thereof in such a manner as to be compressed against the front end periphery of the wire braided net 41 located just on the top of the connection pipe 20, wherein the connection pipe 20 has an adjusting groove 5 formed on one side outer peripheral surface thereof, so that through the width adjustment of the adjusting groove 5, a thickness $D_1$ of one side bonding portion of the connection pipe 20 is the same as a thickness $D_2$ of one side bonding portion of the corrugated pipe 40.

3. A vibration absorbing pipe for a refrigeration compressor, comprising:

a corrugated pipe 40;

a connection pipe 30 adapted to be bonded to one side of the corrugated pipe 40 and having an inclined groove 2 having an inclined portion 3 formed on one side outer peripheral surface thereof and concavo and convex portions 1 formed on the rear side of the inclined groove 2;

a wire braided net 41 adapted to be fitted to the outer peripheral surfaces of the corrugated pipe 40 and the connection pipe 30; and a compression ring 31 having an inclined protruding portion 4 formed on one side inner peripheral surface thereof in such a manner as to be compressed against the front end periphery of the wire braided net 41 located just on the top of the connection pipe 30, wherein the connection pipe 30 has an adjusting groove 5 formed on one side outer peripheral surface thereof, so that through the width adjustment of the adjusting groove 5, a thickness $D_1$ of one side bonding portion of the connection pipe 30 is the same as a thickness $D_2$ of one side bonding portion of the corrugated pipe 40.

\* \* \* \* \*